May 18, 1937.  B. F. SMITH ET AL  2,081,021
PIPE COUPLING
Filed April 24, 1936
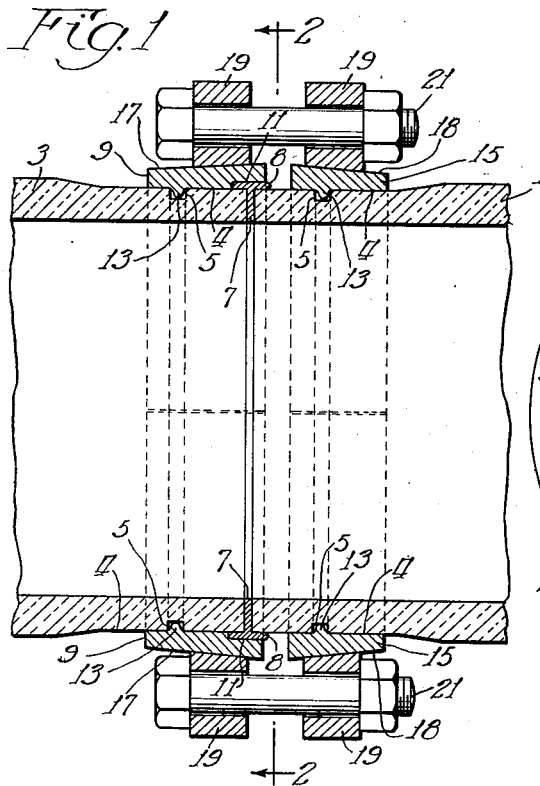
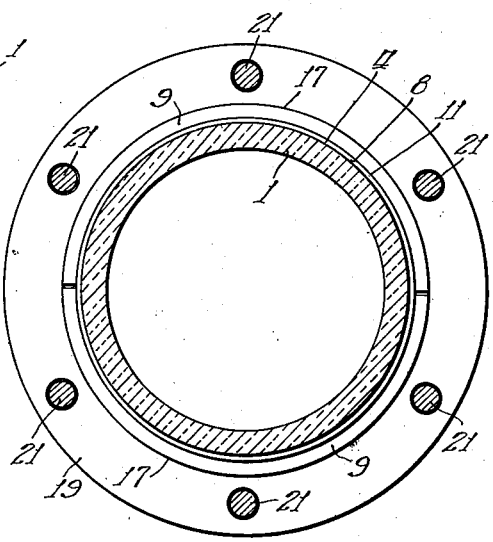
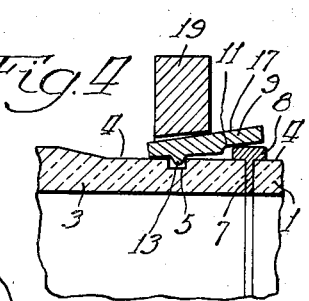
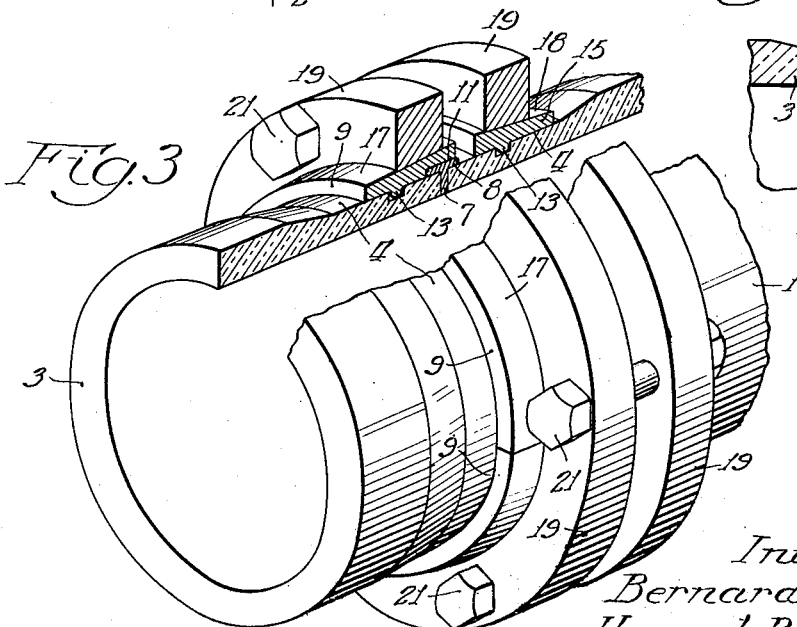
Inventors:
Bernard F. Smith
Howard B. Palmer.

Patented May 18, 1937

2,081,021

UNITED STATES PATENT OFFICE 2,081,021

PIPE COUPLING

Bernard F. Smith and Howard B. Palmer, Appleton, Wis.

Application April 24, 1936, Serial No. 76,135

6 Claims. (Cl. 285—137)

Our invention relates to pipe couplings, and particularly to couplings for inter-connecting lengths of large and medium diameter non-metallic pipes, as for example, the composite cement and asbestos pipe used for conducting acids and other corrosive liquids.

The objects of the invention are to provide a coupling for pipe of this type which shall not require threading or complicated machining of the abutting ends of the pipe lengths to be connected; to provide a coupling which is capable of automatically accommodating itself to ordinary manufacturing inaccuracies so that it may be utilized directly with pipe of the above described type as it is sold by the manufacturer; to provide a coupling which shall be capable of satisfactorily withstanding much greater internal pressures from the liquid in the pipe than any of the couplings heretofore known to the art; and to provide a coupling capable of accomplishing the aforesaid objects which shall be inexpensive to manufacture, rugged in construction, and convenient to use.

Other objects and advantages of the invention will be made more apparent in the following specification and the single sheet of drawing wherein, Fig. 1 is a sectional view of a pipe coupling embodying the features of our invention;

Fig. 2 is a sectional view on the line 2—2 of Fig. 1;

Fig. 3 is a perspective view, partially in section, of the coupling illustrated in Figs. 1 and 2, and Fig. 4 is a fragmentary sectional view illustrating an intermediate step in the inter-connecting of two lengths of pipe by the coupling, illustrated in the other figures of the drawing.

End portions of two lengths of pipe are indicated at 1 and 3. The end of each of these lengths of pipe is ground or otherwise formed, preferably when the pipe is manufactured, so as to provide a generally cylindrical surface 4 of predetermined diameter for engaging the coupling means. An annularly shaped groove 5, substantially rectangular in cross section, is provided at each end of the pipe lengths for facilitating the coupling operation, as will be described in a subsequent paragraph.

A generally T-shaped gasket is positioned intermediate the two pipe lengths to be coupled in such manner that the shank portion 7 of the gasket extends between the opposed surfaces of the abutting ends of the pipe lengths and one side of the head portion 8 of the gasket encircles each of the abutting ends of the pipe lengths. The use of a gasket of this shape is of particular value in making possible a liquid tight connection between the two pipe lengths which is capable of withstanding considerable internal pressure.

The gasket is retained in place by a retaining ring 9 which encircles the end of one of the pipe lengths 3. This ring is preferably of split construction so as to facilitate the assembling of the coupling and is provided with a generally annularly shaped recess 11 formed therein for receiving and compressing the head portion 8 of the gasket. The outer end of the retaining ring extends entirely across the head portion 8 of the gasket, and hence overlies portions of the abutting ends of each of the pipe lengths. To assure accurate positioning of the gasket retaining ring 9, and to permit the two pipe lengths to be urged toward each other during the coupling operation, each of the half portions of the retaining ring is provided with an annularly shaped projection or rib 13 which is adapted to engage the annular slot 5 formed in the end of the pipe length 3 upon which the ring is supported.

A split clamp ring 15 encircles the adjacent abutting end of the other pipe length 1. This ring 15 is likewise provided with an inwardly projecting, annularly shaped rib 13 for engaging the annular slot 5 formed in the end of the pipe length upon which it is supported.

The inner surfaces of the gasket retaining ring 9 and the clamp ring 15 are substantially cylindrical in form and hence closely engage the cylindrical outer surfaces 4 of the abutting ends of the pipe lengths when the coupling is in use. The outer surface 17 of the gasket retaining ring 9 and the corresponding outer surface 18 of the clamp ring 15 have the general form of frustoconical sections, and these surfaces are arranged in opposed relation to each other as is shown particularly in Figs. 1 and 3.

The encircling rings 9 and 15 are clamped into position and the abutting ends of the two pipe lengths 1 and 3 are urged toward each other by means of two annularly shaped flange rings 19 which are adjustably inter-connected by six symmetrically spaced clamping bolts 21. The inner surface of each of the flange rings 19 comprises a frusto-conical section, the dimensions of which correspond to the dimensions of the outer surfaces 17 and 18 of the gasket retaining ring 9 and the clamp ring 15. Thus, during the assembling of coupling the reaction forces produced by tightening of the clamping bolts 21 serve to securely clamp the gasket retaining ring 9 and the clamp ring 15 about the ends of the pipe lengths and to urge the gasket retaining ring 9 and the clamp ring 15 and hence the abutting ends of the pipe lengths toward each other. This action causes the shank portion 7 of the T-shaped gasket to be subjected to a compressive stress which may be readily adjusted to any suitable value to accomplish a liquid tight connection. Movement of the gasket retaining ring 9 and the clamp ring 15 with respect to the supporting pipe lengths is prevented both by the engagement of the rib projections 13 with the annular slots 5 formed in the ends of the pipe lengths, and by the clamping action of the gasket retaining ring and the clamp ring.

The head portion 8 of the T-shaped gasket is made of substantially greater cross sectional area than the area of the annular recess 11 within the gasket retaining ring 9. Thus, during the coupling operation the tightening of the coupling bolts 21 causes the gasket retaining ring 9 to move from the position shown in Fig. 4 to the position shown in Fig. 1, thereby subjecting the head portion of the gasket to a very substantial compressive stress which is applied in a generally radial direction. This compressive stressing of the head portion 8 of the gasket in a radial direction, in combination with the compressive stressing of the shank portion 7 of the gasket in a direction at right angles thereto produced by the urging of the pipe lengths toward each other, serves to securely retain the gasket in position between the abutting ends of the pipe lengths and to provide a liquid tight connection between the two pipe lengths which is capable of withstanding large magnitude internal pressures without leakage.

From the foregoing, it will be seen that we have disclosed the features of a novel coupling intended particularly for inter-connecting lengths of non-metallic or other pipe which cannot conveniently be threaded or accurately machined. Our improved coupling, while simple in design and inexpensive to manufacture, is extremely rugged in construction and is capable of producing a much more satisfactory joint than any couplings for this type of pipe heretofore known to the art. Further, our improved coupling is capable of automatically accommodating itself to ordinary manufacturing inaccuracies in the pipe with which it is used without impairment of its ability to produce a liquid tight joint which is capable of withstanding considerable internal pressure without leakage. At the same time our improved coupling may be readily disassembled for the purpose of replacing lengths of pipe or altering the piping.

Various modifications may be made in the form of our invention without departing from the principles disclosed in the foregoing, and it is our intention that the accompanying claims shall be accorded the broadest reasonable construction consistent with the state of the art.

We claim the following as our invention:

1. In a coupling of the class described, a gasket having a portion which extends between the abutting ends of the pipe lengths to be coupled and a portion which overlies portions of the outer surfaces of the abutting ends of those pipe lengths, means for urging the ends of the pipes toward each other thereby subjecting the first mentioned portion of said gasket to compressive stress the line of action of which is generally parallel to the axis of the pipe lengths, and means comprising a ring having a portion which encircles and overlies the abutting ends of both of the pipe lengths and the overlying portion of said gasket for subjecting that portion of said gasket to compressive stress the line of action of which is in a generally radial direction with respect to the pipe lengths.

2. In a coupling of the class described, a generally T-shaped gasket, the shank portion of which is adapted to extend between the abutting ends of the pipe lengths to be coupled and the head portion of which encircles the abutting ends of the pipe lengths, means for urging the ends of the pipe lengths to be coupled toward each other thereby subjecting the shank portion to compressive stress, a retaining ring for said gasket which overlies the head portion of said gasket and the abutting ends of the pipe lengths, and means for clamping said retaining ring about the pipe lengths during the coupling operation thereby compressing the head portion of said gasket between the inner surfaces of said clamping ring and the outer surfaces of the ends of the pipe lengths.

3. In a coupling of the class described, a generally T-shaped gasket, the shank portion of which is adapted to extend between the abutting ends of the pipe lengths to be connected and the head portion of which encircles the abutting ends of the pipe lengths, a split retaining ring for said gasket which overlies portions of the abutting ends of both of the pipe lengths, and a common means for clamping said retaining ring about said pipe lengths during the coupling operation and for urging the ends of the pipe lengths toward each other so as to subject the shank portion of the gasket to compressive stress.

4. In a coupling of the class described, a gasket having a portion which extends between the ends of the pipe lengths to be connected, a gasket retaining ring encircling the end of one of the pipe lengths so as to overlie said gasket, a clamp ring encircling the end of the other pipe length, a pair of flange rings one of which encircles said gasket retaining ring and the other of which encircles said clamp ring, and means for adjustably moving said flange rings toward each other during the coupling operation, said flange rings, said gasket retaining ring, and said clamp ring having cooperating surfaces whereby movement of said flange rings causes said gasket retaining ring and said clamp ring to tightly engage the ends of the pipe lengths and also serves to urge the ends of the pipe lengths toward each other.

5. In a coupling of the class described, a generally T-shaped gasket, the shank portion of which is adapted to extend between the abutting ends of the pipe lengths to be coupled and the head portion of which encircles the abutting ends of the pipe lengths, a retaining ring for the gasket having a generally conical outer surface and means on the inner surface thereof for engaging the outer surface of one of the pipe lengths, a clamp ring having a generally conical outer surface and being adapted to encircle the end of the other pipe length, a pair of flange rings having generally conical inner surfaces for cooperating with the similar surfaces of said gasket retaining ring and said clamp ring, and means for moving said flange rings toward each other during the coupling operation, this movement causing said gasket retaining ring and said clamp ring to tightly encircle the ends of the pipe lengths and also to urge the pipe lengths toward each other.

6. In a coupling of the class described, a generally T-shaped gasket, the shank portion of which is adapted to extend between the abutting ends of the pipe lengths to be coupled and the head portion of which encircles the abutting ends of the pipe lengths, a split gasket retaining ring which encircles the abutting ends of the pipe lengths and overlies said gasket, said gasket retaining ring having a generally conical outer surface and an annular rib on the inner surface thereof for engaging an annular groove formed at the end of one of the pipe lengths, and a split clamping ring which encircles the end of the other pipe length, said clamping ring having a generally conical outer surface and an inwardly projecting generally annular rib for engaging an annular groove formed at the end of the other pipe length, a pair of flange rings one of which encircles said gasket retaining ring and the other of which encircles said clamping ring, said flange rings having generally conical inner surfaces for cooperating with the similar surfaces of the gasket retaining ring and the clamp ring, and means for moving said flange rings toward each other during the coupling operation, this movement causing the gasket retaining ring and the clamp ring to tightly encircle the ends of the pipe lengths and also to urge the pipe lengths toward each other.

BERNARD F. SMITH.
HOWARD B. PALMER.